(12) United States Patent
Uramoto et al.

(10) Patent No.: US 9,577,439 B2
(45) Date of Patent: *Feb. 21, 2017

(54) POWER RELAYING APPARATUS, POWER TRANSMISSION SYSTEM AND METHOD FOR MANUFACTURING POWER RELAYING APPARATUS

(71) Applicant: Sony Corporation, Tokyo (JP)

(72) Inventors: Yoichi Uramoto, Kanagawa (JP); Takashi Narikiyo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/724,264

(22) Filed: May 28, 2015

(65) Prior Publication Data

US 2015/0263538 A1    Sep. 17, 2015

Related U.S. Application Data

(63) Continuation of application No. 13/178,589, filed on Jul. 8, 2011, now Pat. No. 9,077,193.

(30) Foreign Application Priority Data

Jul. 15, 2010   (JP) ................................. 2010-160412

(51) Int. Cl.
| | |
|---|---|
| *H01F 27/42* | (2006.01) |
| *H01F 37/00* | (2006.01) |
| *H01F 38/00* | (2006.01) |
| *H02J 5/00* | (2016.01) |

(52) U.S. Cl.
CPC ...................... *H02J 5/005* (2013.01)

(58) Field of Classification Search
CPC .......... H02J 5/005; H02J 17/00; H02J 17/005; H02J 7/025; H01F 38/14
See application file for complete search history.

(56) References Cited

U.S. PATENT DOCUMENTS

| | | | |
|---|---|---|---|
| 8,421,274 B2 | 4/2013 | Sun et al. | |
| 9,077,193 B2 * | 7/2015 | Uramoto | ................. H02J 5/005 |

(Continued)

FOREIGN PATENT DOCUMENTS

| | | |
|---|---|---|
| CN | 101471587 | 7/2009 |
| JP | 06-077863 | 3/1994 |

(Continued)

OTHER PUBLICATIONS

Chinese Office Action regarding Application No. 201110191212.9 (Issuing Date: Apr. 9, 2015).

(Continued)

*Primary Examiner* — Rexford Barnie
*Assistant Examiner* — Rasem Mourad
(74) *Attorney, Agent, or Firm* — Chip Law Group

(57) ABSTRACT

Disclosed herein is a power relaying apparatus provided between: a power supplying apparatus including a power supplying resonance device and a power supplying power supply section for supplying an AC current to the power supplying resonance device; and a power receiving apparatus having a power receiving resonance device for receiving a power from the power supplying apparatus by adoption of a resonance method, the power relaying apparatus including a power relaying resonance device resonating between the power supplying resonance device and the power receiving resonance device, wherein the power relaying resonance device is fixed at a predetermined position by making use of an insulation member.

10 Claims, 12 Drawing Sheets

(56) References Cited

U.S. PATENT DOCUMENTS

| | | |
|---|---|---|
| 2007/0182367 A1 | 8/2007 | Partovi |
| 2009/0153273 A1* | 6/2009 | Chen .................. G08C 17/04 333/219 |
| 2009/0284083 A1 | 11/2009 | Karalis et al. |
| 2010/0231340 A1 | 9/2010 | Florello et al. |
| 2010/0259108 A1* | 10/2010 | Giler .................. B60L 11/182 307/104 |
| 2010/0264747 A1* | 10/2010 | Hall .................. B60L 11/182 307/104 |
| 2012/0153732 A1* | 6/2012 | Kurs .................. B60L 3/0069 307/104 |

FOREIGN PATENT DOCUMENTS

| | | |
|---|---|---|
| JP | 11-214905 | 8/1999 |
| JP | 11214905 A * | 8/1999 |
| JP | 2003-272938 | 9/2003 |
| JP | 2004-333242 | 11/2004 |
| JP | 2008-508842 | 3/2008 |
| JP | 2008-099425 | 4/2008 |
| JP | 2008-263740 | 10/2008 |
| JP | 2009-527147 | 7/2009 |
| JP | 2010-520716 | 6/2010 |
| JP | 2010-173503 | 8/2010 |
| JP | 2011-030317 | 2/2011 |
| WO | WO/2009/140506 | 11/2009 |

OTHER PUBLICATIONS

Chinese Office Examination Report issued in connection with related Chinese Patent Application No. CN 201110191212.9 dated Aug. 6, 2014.

Japanese Office Examination Report issued in connection with related Japanese Patent Application No. JP 2010-160412 dated May 7, 2014.

* cited by examiner

F I G . 1
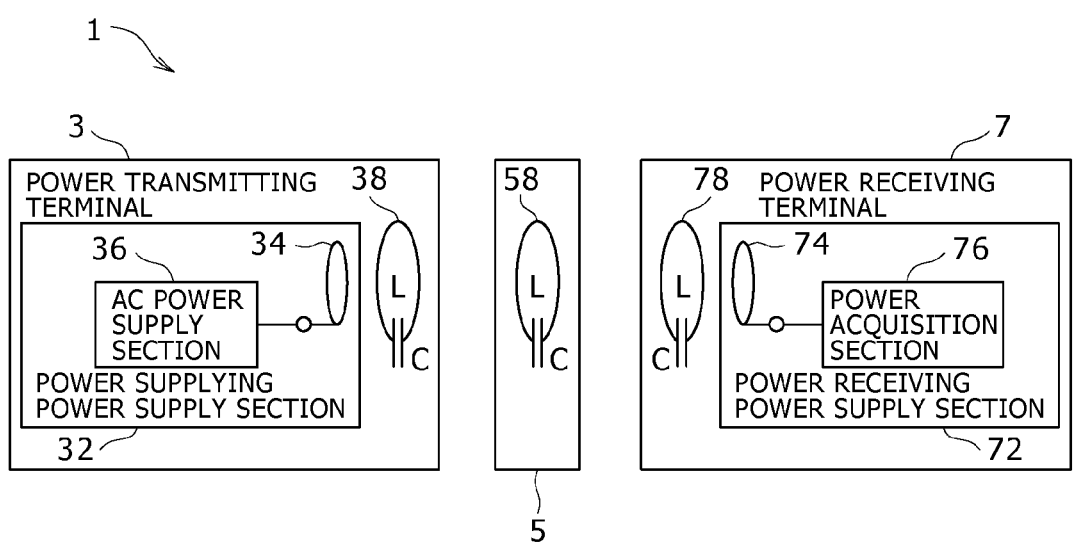

421: POWER-TRANSMITTING-SIDE CLOSEST POINT
422: POWER TRANSMITTING SIDE RELATIVE TO A MIDDLE POINT
423: MIDDLE POINT
424: POWER RECEIVING SIDE RELATIVE TO A MIDDLE POINT
425: POWER-RECEIVING-SIDE CLOSEST POINT

A REPEATER 558 IS
ACCOMMODATED IN AN
ACCOMMODATION CASE 570

POWER RELAYING APPARATUS, POWER TRANSMISSION SYSTEM AND METHOD FOR MANUFACTURING POWER RELAYING APPARATUS

RELATED APPLICATION DATA

This application is a continuation of U.S. patent application Ser. No. 13/178,589 filed Jul. 8, 2011, the entirety of which is incorporated herein by reference to the extent permitted by law. The present application claims the benefit of priority to Japanese Patent Application No. JP 2010-160412 filed on Jul. 15, 2010 in the Japan Patent Office, the entirety of which is incorporated by reference herein to the extent permitted by law.

BACKGROUND

The present disclosure relates to a power relaying apparatus, a power transmission system including the power relaying apparatus and a method for manufacturing the power relaying apparatus. The power relaying apparatus is also referred to as a power relaying terminal or a repeater. To put it in more detail, the present disclosure relates to a technology for transmitting power in a non-contact way also referred to as a wireless way by applying a resonance technique.

There have been proposed a plurality of methods for transmitting power from a power supplying apparatus also referred to as a power transmitting terminal to a power receiving apparatus also referred to as a power receiving terminal in a non-contact way. A method for transmitting power in a non-contact way is also referred to as a non-contact power supplying method, a wireless power supplying method or a wireless power transmission method. The power transferred to an electronic apparatus serving as a power receiving apparatus on the power receiving side can be utilized as power used for driving the electronic apparatus. As an alternative, by configuring the power receiving apparatus to serve as a power accumulator, the power transferred to the electronic apparatus on the power receiving side in the wireless way can be used as power utilized for electrically charging a secondary battery employed in the electronic apparatus.

The principle of the non-contact power transmission makes use of electro-magnetic energy. The non-contact power transmission is categorized into two large categories, i.e., radiation transmission and non-radiation transmission. The radiation transmission is also referred to as electric-wave receiving or electric-wave harvesting. The radiation transmission is further categorized into microwave radiation transmission and laser radiation transmission. On the other hand, the non-radiation transmission is further categorized into electromagnetic induction non-radiation transmission and resonance non-radiation transmission also referred to as electromagnetic resonance non-radiation transmission. Nowadays, attention is paid to the resonance transmission making use of either of electric-field resonance and magnetic-field resonance which are advantageous as viewed from several modes including the efficiency, the transmission distance, the positional shift and the angular shift. In particular, attention is focused on a method referred to as a magnetic-field resonance method or a magnetic resonance method. The magnetic-field resonance method or the magnetic resonance method makes use of the magnetic-field resonance which is affected only a little bit by energy absorption by a biological body. That is to say, the magnetic-field resonance has a small dielectric-substance loss. For more information on the magnetic-field resonance method or the magnetic resonance method, the reader is advised to refer to PCT Patent Publication No. WO 2009-140506.

The resonance method is a method for transmitting power from a power supplying apparatus for supplying power to a power receiving apparatus for receiving power transmitted by the power supplying apparatus by making use of coupling based on resonance of an electric or magnetic field between a resonance device employed in the power supplying apparatus and a resonance device employed in the power receiving apparatus. In the following description, the resonance method making use of the resonance of an electric field is referred to as an electric-field resonance method whereas the resonance method making use of the resonance of a magnetic field is referred to as a magnetic-field resonance method.

SUMMARY

In a power transmission system making use of resonance, however, the maximum efficiency of transmission between a resonance device employed in a power supplying apparatus of the power transmission system and a resonance device employed in the power receiving apparatus of the power transmission system is determined by the product (k×Q) where reference symbol Q denotes the Q value of the resonance devices whereas reference symbol k denotes the coefficient of coupling between the resonance devices. The coupling coefficient k is also dependent on the distance between the resonance devices. For example, the longer the distance between the resonance devices, the smaller the coupling coefficient k and, hence, the lower the efficiency of the power transmission.

As a possible solution to the above problem, a third resonance device is provided between the resonance devices to serve as a resonance device of a power relaying apparatus also referred to as a repeater. The third resonance device relays the transmitted power so as to improve the distance characteristic, that is, in order to lengthen the transmission distance. In this case, however, there are raised a problem as to where the power relaying apparatus is to be placed and a problem of how an optimum position of the power relaying apparatus is determined.

It is thus an aim of the present disclosure to provide a technology for placing a power relaying apparatus by adoption of a proper method and/or a technology for placing a power relaying apparatus at a proper position in application of a power transmission technology making use of resonance. To put it in detail, the embodiments of the present disclosure provide a technology capable of placing a power relaying apparatus (or, in particular, its power relaying resonance device) by adoption of a proper method and/or a technology capable of placing a power relaying apparatus (or, in particular, its power relaying resonance device) at a proper position.

In accordance with the embodiments of the present disclosure, there is provided a non-contact power transmission system configured to include:

a power supplying apparatus having a power supplying resonance device and a power supplying power supply section for supplying an AC current to the power supplying resonance device;

a power receiving apparatus having a power receiving resonance device for receiving a power from the power supplying apparatus by adoption of a resonance method; and a power relaying apparatus placed between the power supplying apparatus and the power receiving apparatus and provided with a power relaying resonance device resonating between the power supplying resonance device and the power receiving resonance device.

In the power relaying apparatus also referred to as a power relaying terminal, the power relaying resonance device is provided at a position determined in advance by making use of an insulation member. The insulation member has a bearing force for bearing power transmission carried out by adoption of the resonance method.

In a process of manufacturing such a power relaying terminal, the power relaying resonance device employed in the power relaying terminal is fixed at a predetermined position by making use of the insulation member. The process typically adopts a method whereby, after the power relaying resonance device has been accommodated in an accommodation case capable of accommodating the power relaying resonance device therein, the inside of the case is filled up with the insulation member. As an alternative, the process typically adopts another method whereby, after every power relaying resonance device has been provided in one of segments obtained as a result of dividing a segmentation mechanism for aligning the power relaying resonance device, the power relaying resonance device is fixed by making use of the insulation member.

In accordance with the embodiments of the present disclosure, by making use of the power relaying apparatus in application to non-contact power transmission adopting the resonance method, the distance characteristic can be improved. In addition, the power relaying resonance device of the power relaying apparatus is fixed by adoption of a proper method so that the transmission characteristic obtained by making use of the power relaying resonance device does not deteriorate. If a plurality of power relaying resonance devices are used, each of the power relaying resonance devices can be provided at a proper position by adoption of a proper method so that the transmission characteristic obtained by making use of the power relaying resonance devices does not deteriorate.

BRIEF DESCRIPTION OF THE DRAWINGS

FIG. 1 is a diagram roughly showing the entire configuration of a non-contact power transmission system according to an embodiment of the present disclosure;

DETAILED DESCRIPTION OF THE PREFERRED EMBODIMENTS

Figure 2A:
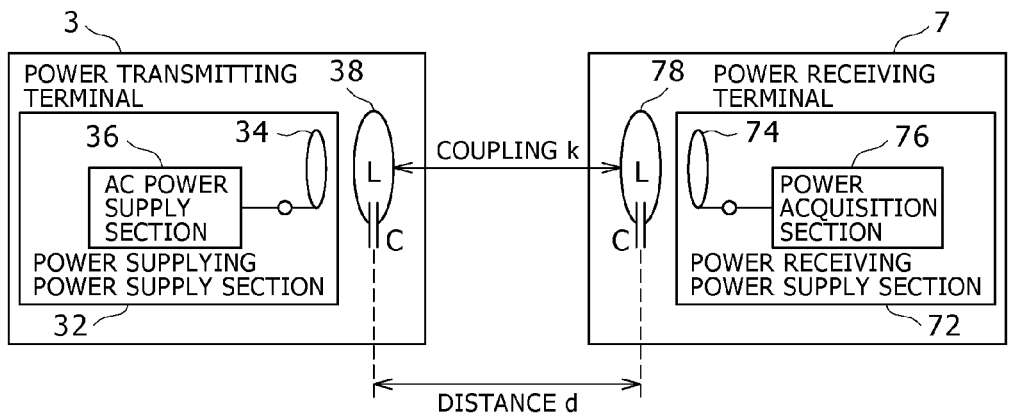
FIGS. 2A to 2C are explanatory diagrams to be referred to in description of resonance relations for a case in which a power relaying terminal does not exist.

Embodiments of the present disclosure are explained below by referring to diagrams. It is to be noted that the embodiments are described in chapters arranged as follows.
1: Whole Overview (Configurations and Resonance Relations)
2: Arrangement Problems and Solution Principles (Fixing Techniques and Technique for Placing Repeaters)
3: First Embodiment (First to Fourth Typical Examples)
4: Second Embodiment (First to Third Typical Examples)
Whole Overview
Configuration FIG. 1 is a diagram roughly showing the entire configuration of a non-contact power transmission system 1 according to an embodiment of the present disclosure. The non-contact power transmission system 1 according to the embodiment employs a power supplying terminal 3 also referred to as a power supplying apparatus or a power transmitting terminal, a power relaying terminal 5 also referred to as a power relaying apparatus and a power receiving terminal 7 also referred to as a power receiving apparatus.

The power supplying terminal 3 has a power supplying power supply section 32 for generating an AC current and a power supplying resonance device 38 for receiving the AC current generated by the power supplying power supply section 32. The power supplying resonance device 38 serves as a power supplying resonator.

The power supplying power supply section 32 includes a power supplying excitement device 34 for exciting the power supplying resonance device 38 through electromagnetic induction coupling and an AC power supply section 36 for supplying the AC current to the power supplying excitement device 34. In this configuration, the power supplying excitement device 34 for supplying a power in the form of an AC current to the power supplying resonance device 38 is provided. It is to be noted, however, that another configuration for providing a power to the power supplying resonance device 38 can be provided. As will be described later, in the other configuration, the power supplying excitement device 34 is not used.

Typically, the AC power supply section 36 employs a modulation section and a power amplification section which are not shown in the figure. The modulation section includes an oscillation section and a frequency mixing section. The oscillation section generates an AC power having a frequency determined in advance in the form of an AC current. The frequency mixing section superposes a control signal on the AC power generated by the oscillation section by adopting any of a plurality of commonly known modulation methods. The power amplification section amplifies the AC power modulated by the modulation section. If transmission of the control signal is not required, it is not necessary to provide the frequency mixing section. In this case, the AC power generated by the oscillation section at the frequency determined in advance is amplified by the power amplification section before being supplied to the power supplying excitement device 34. The AC power without a control signal superposed thereon is referred to as the so-called unmodulated carrier.

The oscillation section generates an electrical signal having a certain frequency component. In the case of this typical example, however, the oscillation section generates an AC power in the form of an AC current having a frequency about equal to the self-resonant frequency of the power supplying resonance device 38. That is to say, in an optimum state, the oscillation section generates an AC power in the form of an AC current having a frequency perfectly equal to the self-resonant frequency of the power supplying resonance device 38.

The power supplying excitement device 34 is excited by the electrical signal received from the AC power supply section 36 to operate as a device for transmitting the AC power to the power supplying resonance device 38 through coupling based on an electromagnetic induction effect. By setting impedance matching between the AC power supply section 36 and the power supplying resonance device 38, the power supplying excitement device 34 performs the role of avoiding reflection of the electrical signal. In place of the power supplying excitement device 34, it is also possible to provide a functional section for automatically adjusting the power supplied to the power supplying resonance device 38 and parameters of the power supplying resonance device 38.

The power receiving terminal 7 has a power receiving power supply section 72 and a power receiving resonance device 78 serving as a power receiving resonator. The power receiving resonance device 78 receives the power transmitted by the power supplying terminal 3 by adoption of a magnetic-field resonance method. The power receiving power supply section 72 has a power receiving excitement device 74 excited by the power receiving resonance device 78 through electromagnetic induction coupling and a power acquisition section 76 for receiving a power on the basis of an AC current generated by the power receiving excitement device 74. In this configuration, the power receiving power supply section 72 has the power receiving excitement device 74 for receiving a power in the form of an AC current from the power receiving resonance device 78. It is to be noted, however, that another configuration for receiving a power from the power receiving resonance device 78 can be provided. As will be described later, in the other configuration, the power receiving excitement device 74 is not used.

The power acquisition section 76 typically has a current rectification section, a secondary battery, a DC-DC converter and a load which are not shown in the figure. The current rectification section rectifies the received AC current into a DC current in order to generate a DC power. The secondary battery is electrically charged with the DC power. The DC-DC converter raises or lowers the voltage of the secondary battery. Typical examples of the load are a motor and an electrical circuit. In addition, if a control signal has been superposed on the AC power in the power supplying terminal 3, the power receiving power supply section 72 is provided with a demodulation section for demodulating the AC power having the control signal superposed thereon in order to reproduce the control signal.

The power receiving excitement device 74 is excited by an electrical signal generated by the power receiving resonance device 78 to serve as a device for outputting an electrical signal to the power acquisition section 76 through coupling based on an electromagnetic induction effect. By setting impedance matching between the power receiving resonance device 78 and the power acquisition section 76, the power receiving excitement device 74 performs the role of avoiding reflection of the electrical signal. In place of the power receiving excitement device 74, it is also possible to provide a functional section for automatically adjusting the power received from the power receiving resonance device 78 and parameters of the power receiving resonance device 78.

The power relaying terminal 5 has a power relaying resonance device 58 capable of resonating with each of the power supplying resonance device 38 employed in the power supplying terminal 3 and the power receiving resonance device 78 employed in the power receiving terminal 7. The power relaying resonance device 58 is also referred to as a power relaying resonator or a repeater.

Each of the power supplying resonance device 38 and the power receiving resonance device 78 is also referred to as a resonator or an antenna. An electric-field antenna to be used for electric-field resonance is so designed that the electric field is concentrated on the coupling surface. That is to say, the electric-field antenna is so designed that a magnetic field does not appear on the coupling surface. For example, a planar antenna is used. A typical example of the planar antenna is a meander line antenna made by creating a zigzag semiconductor pattern on a planar shape. On the other hand, a magnetic-field antenna to be used for magnetic-field resonance is so designed that the magnetic field is concentrated on coupling surface. That is to say, the magnetic-field antenna is so designed that an electric field does not appear on the coupling surface. For example, a coil-shaped antenna is used. Typical examples of the coil-shaped antenna are a spiral resonator and a helical antenna made by winding a conductor to form a helix shape.

The power relaying resonance device 58 can be coupled to the power supplying resonance device 38 and the power receiving resonance device 78 by adoption of the resonance method. For example, a coil-shaped antenna is used as the power relaying resonance device 58. Typical examples of the coil-shaped antenna are a spiral resonator and a helical antenna made by winding a conductor to form a helix shape.

Each of the power supplying resonance device 38, the power relaying resonance device 58 and the power receiving resonance device 78 has an inductance component L and a capacitance component C. It is possible to find the self-resonant frequency ($\omega 0$ and $f0 = \omega 0 / 2\pi$) based on the commonly known expression ($1/\sqrt{L*C}$).

In the apparatus configuration like the one described above, when the power supplying power supply section 32 employed in the power supplying terminal 3 supplies an AC power to the power supplying resonance device 38 also employed in the power supplying terminal 3, the AC power is transmitted to the power receiving resonance device 78 employed in the power receiving terminal 7 by way of the power relaying resonance device 58 employed in the power relaying terminal 5. That is to say, when the AC power supply section 36 supplies an AC current to the power supplying excitement device 34, an AC current is generated by excitement in the power supplying resonance device 38 due to electromagnetic induction. Since the power supplying resonance device 38, the power relaying resonance device 58 and the power receiving resonance device 78 are provided at locations so related to each other that mutual magnetic resonance occurs with ease, an AC power is supplied from the power supplying resonance device 38 to the power receiving resonance device 78 by way of the power relaying resonance device 58 in a non-contact way at the self-resonant frequency. Then, a current is supplied from the power receiving resonance device 78 to the power receiving excitement device 74 and a power is taken by the power acquisition section 76 from the power receiving excitement device 74.

If the power relaying terminal 5 is not used for example, the power supplying resonance device 38 and the power receiving resonance device 78 are provided at locations so related to each other that mutual magnetic resonance occurs with ease as is generally known. In this case, when the self-resonant frequency of the power supplying resonance device 38 serving as a power supplying source matches the self-resonant frequency of the power receiving resonance device 78 serving as a power receiving destination, the power supplying resonance device 38 and the power receiving resonance device 78 are in a resonance relation providing a maximum quantity of a transferred power and a minimum loss.

This relation also holds true as well for a case in which the power relaying terminal 5 employing the power relaying resonance device 58 is used. That is to say, the relation holds true when the power supplying resonance device 38, the power relaying resonance device 58 and the power receiving resonance device 78 are provided at locations so related to each other that mutual magnetic resonance occurs with ease. In this case, if the self-resonant frequency of the power supplying resonance device 38 serving as a power supplying source, the self-resonant frequency of the power relaying resonance device 58 serving as power relaying means and the self-resonant frequency of the power receiving resonance device 78 serving as a power receiving destination match each other, the power supplying resonance device 38, the power relaying resonance device 58 and the power receiving resonance device 78 are in a resonance relation providing a maximum quantity of a transferred power and a minimum loss. That is to say, by setting all the self-resonant frequency of the power supplying resonance device 38, the self-resonant frequency of the power relaying resonance device 58 and the self-resonant frequency of the power receiving resonance device 78 at the same value, the efficiency of the power transmission from the power supplying terminal 3 to the power receiving terminal 7 can be increased to an optimum value. It is to be noted that, if only one power relaying resonance device 58 is used, an optimum value of the power transmission efficiency can be achieved by providing the power relaying resonance device 58 at a middle position between the power supplying resonance device 38 and the power receiving resonance device 78.

Resonance Relations

Figure 2B:
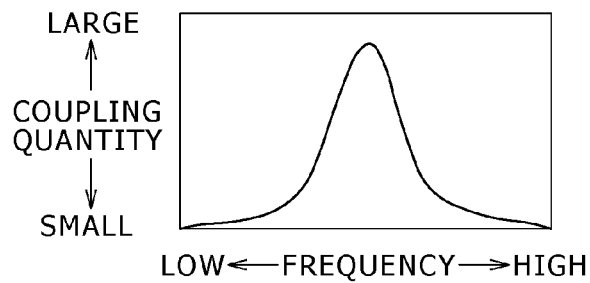
Figure 2C:
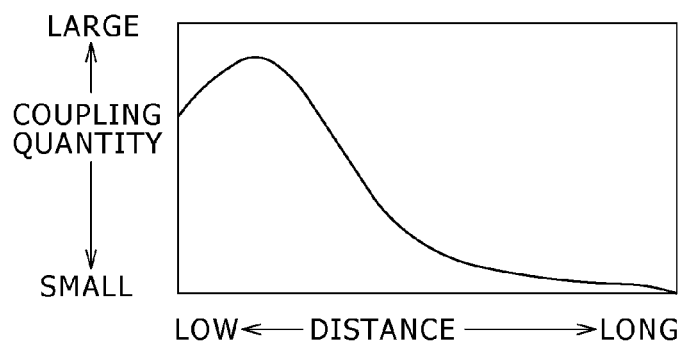
Figure 3A:
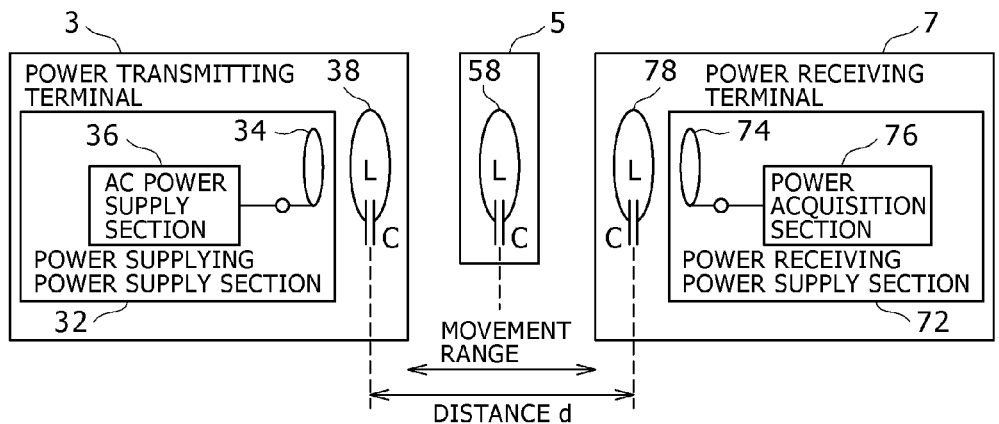
FIGS. 3A to 3C are explanatory diagrams to be referred to in description of resonance relations for a case in which a power relaying terminal exists.
Figure 3B:
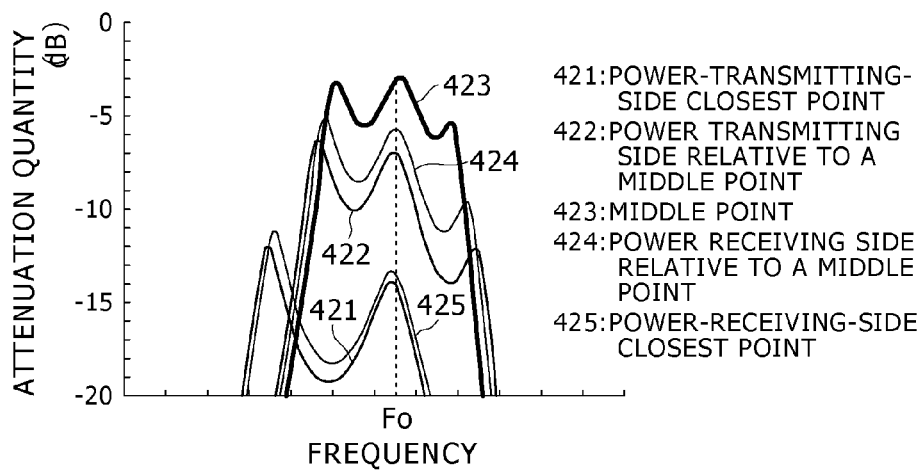
Figure 3C:
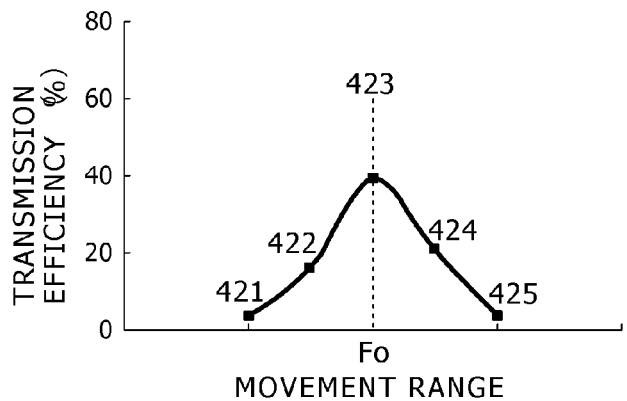
Figure 4A:
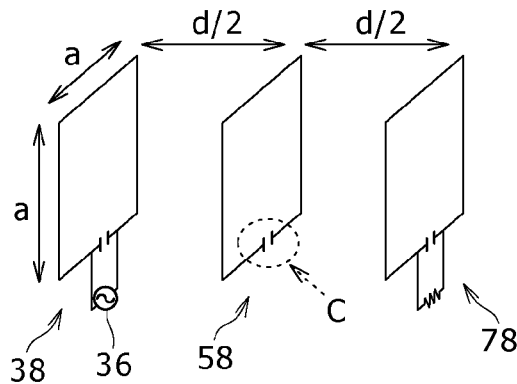
FIGS. 4A to 4C are explanatory diagrams to be referred to in description of a circuit analysis of electromagnetic resonance.
Figure 4B:
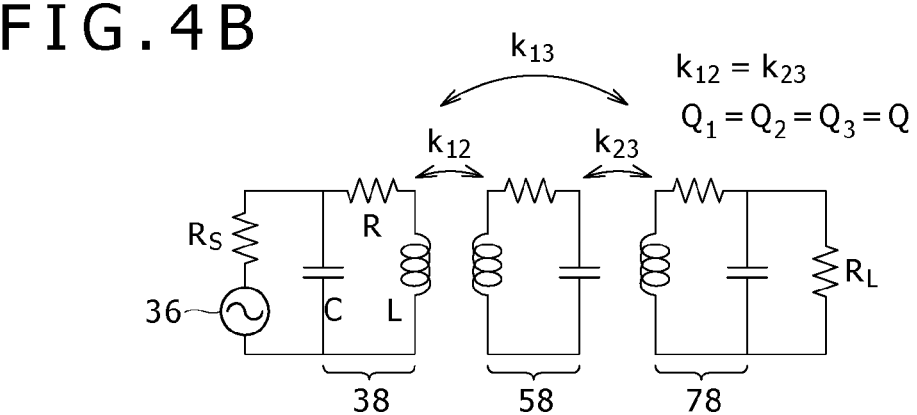
Figure 4C:
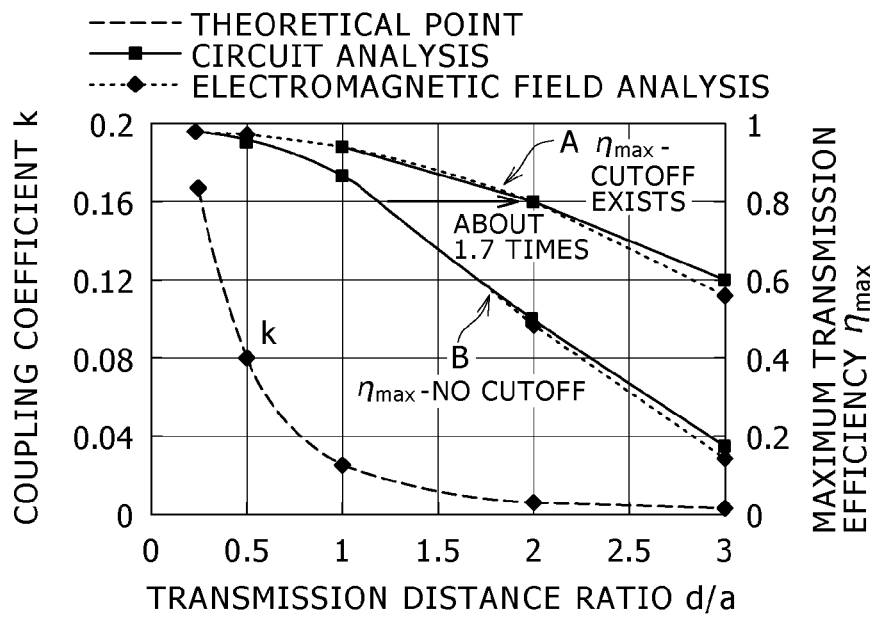

Resonance relations are explained by referring to FIGS. 2A to 4C as follows. FIGS. 2A to 2C are a plurality of explanatory diagrams referred to in the following description of resonance relations for a case in which a power relaying terminal does not exist. FIGS. 3A to 3C are a plurality of explanatory diagrams referred to in the following description of resonance relations for a case in which a power relaying terminal exists. FIGS. 4A to 4C are a plurality of explanatory diagrams referred to in the following description of a circuit analysis of electromagnetic resonance.

FIG. 2B is a diagram showing a transmission characteristic representing a relation between the frequency of an AC current generated by the AC power supply section 36 and the coupling quantity for a case in which a power relaying terminal 5 does not exist as shown in FIG. 2A. As is obvious from FIG. 2B, there is a resonance frequency. To put it in detail, the transmission characteristic is a single-peak characteristic having a peak at the self-resonant frequency. FIG. 2C is a diagram showing a relation between the distance from one resonance device to another resonance device and the coupling quantity or the attenuation quantity. As is obvious from FIG. 2C, for a certain resonance frequency, there is a resonance-device distance at which the coupling quantity is equal to the maximum value. In addition, for a low resonance frequency, the maximum coupling quantity can be obtained by increasing the distance between resonance devices whereas, for a high resonance frequency, on the other hand, the maximum coupling quantity can be obtained by decreasing the distance between resonance devices. However, these phenomena are not shown in the figures.

On the other hand, FIG. 3B is a diagram showing relations between the frequency of an AC current generated by the AC power supply section 36 and the coupling quantity or the attenuation quantity whereas FIG. 3C is a diagram showing a relation between the distance from one resonance device to another resonance device and the transmission efficiency for a case in which a power relaying terminal 5 exists as shown in FIG. 3A. As is obvious from in FIG. 3B, the attenuation quantity varies in accordance with the frequency. As is obvious from FIG. 3C, on the other hand, there is a resonance-device distance at which the transmission efficiency is equal to the maximum value. To put it concretely, by providing the power relaying resonance device 58 at a middle position between the power supplying resonance device 38 and the power receiving resonance device 78, at a frequency close to the self-resonant frequency also referred to simply as a resonance frequency, the attenuation quantity can be set at a minimum value as shown in FIG. 3B whereas the transmission efficiency can be set at a maximum value as shown in FIG. 3C.

Thus, it is possible to lengthen the transmission distance allowing the efficiency of the transmission between the power supplying resonance device 38 and the power receiving resonance device 78 to be sustained at a fixed value. As shown in FIG. 4A for example, each of the power supplying resonance device 38, the power relaying resonance device 58 and the power receiving resonance device 78 is designed as a rectangular loop antenna having a rectangular loop coil and an externally attached capacitor. The rectangular loop coil has a side a and a line diameter $b\phi$, being made from copper or the like. On the other hand, the externally attached capacitor has a capacitance C [cpF]. The rectangular loop antenna has a self-resonant frequency f0 [MHz].

FIG. 4B is a diagram showing an equivalent circuit of the configuration shown in FIG. 4A. Each of the rectangular loop antennas can be represented by a resistance component R, an inductance component L and a capacitance component C. The equivalent circuit shown in FIG. 4B is in a state of magnetic-field resonance. The magnetic-field resonance provides coupling in a magnetic field. In the state of the magnetic-field resonance, each antenna serving as a resonator can be represented by an LC resonator whereas the coupling can be represented by a mutual inductance Lm having a coupling coefficient k.

A circuit analysis is carried out in order to find the maximum efficiency of the transmission between the power supplying resonance device 38 and the power receiving resonance device 78. The circuit analysis is carried out by assuming that the coefficient of coupling between the power supplying resonance device 38 and the power receiving resonance device 78 is k whereas the resistance of the resistance component of each rectangular loop antenna is R, the inductance of the inductance component of each rectangular loop antenna is L and the capacitance of the capacitance component of each rectangular loop antenna is C and by matching the impedances Rs and Rl of respectively the power supplying power supply section 32 serving as a signal source and the power receiving power supply section 72 serving as a load. By placing the power relaying resonance device 58 having a self-resonant frequency equal to the self-resonant frequencies of the power supplying resonance device 38 and the power receiving resonance device 78 at a middle location between the power supplying resonance device 38 and the power receiving resonance device 78, the equivalent circuit can be configured into three stages.

Results of the circuit analysis described above are shown in FIG. 4C. In FIG. 4C, a curve pointed to by an arrow A represents the circuit-analysis result obtained for a configuration including the power relaying resonance device 58 placed at a middle location between the power supplying resonance device 38 and the power receiving resonance device 78 whereas a curve pointed to by an arrow B represents the circuit-analysis result obtained for a configuration not including the power relaying resonance device 58. In comparison with the configuration not including the power relaying resonance device 58, in the case of the configuration including the power relaying resonance device 58, the attenuation quantity can be suppressed to a small value even for a long transmission distance. Thus, the efficiency of the transmission can be improved. In the case of the configuration including the power relaying resonance device 58 for example, at a transmission efficiency of 80%, the distance characteristic is 1.7 times that of the configuration not including the power relaying resonance device 58, showing a great improvement.

An equivalent circuit for the electric-field resonance and the characteristics of the equivalent circuit are not shown in a figure. However, the equivalent circuit for the electric-field resonance and the characteristics of the equivalent circuit can be thought in the same way as those for the magnetic-field resonance. That is to say, the electric-field resonance provides coupling in an electric field. In the state of the electric-field resonance, each antenna serving as a resonator can be represented by an LC resonator whereas the coupling can be represented by a mutual capacitance Cm having a coupling coefficient k. In other words, the electric-field resonance is different from the magnetic-field resonance in that, in the case of the electric-field resonance, the coupling is represented by a mutual capacitance Cm whereas, in the case of the magnetic-field resonance, the coupling is represented by a mutual inductance Lm. Nevertheless, the electric-field resonance is not much different electromagnetically from the magnetic-field resonance. For example, the characteristics such as the power loss and the transmission efficiency in the electric-field resonance can be thought in the same way as those in the magnetic-field resonance.

As described above, only one power relaying resonance device 58 exists at a middle position between the power supplying resonance device 38 and the power receiving resonance device 78. It is to be noted, however, that a plurality of power relaying resonance devices 58 may be used. In this case, the transmission distance can be further increased.

In addition, as commonly known, the transmission efficiency can be improved to a certain degree without adjusting the angle of each of the resonance devices in a rigorous manner. The characteristic value of each of the power supplying resonance device 38, the power relaying resonance device 58 and the power receiving resonance device 78 varies due to the posture of the power supplying resonance device 38, the power relaying resonance device 58 and the power receiving resonance device 78. The posture includes the direction and the angle. However, the basic characteristic waveforms of the power supplying resonance device 38, the power relaying resonance device 58 and the power receiving resonance device 78 are approximately identical with each other. It is to be noted that, if the axis of any particular resonance device is electromagnetically perpendicular to the axis of another resonance device, that is, if the axis of any particular resonance device is electromagnetically rotated by 90 degrees from the axis of another resonance device, the coupling based on the rotation of the magnetic field is almost not established. Thus, the attenuation quantity increases considerably. In actuality, however, the axis of any particular resonance device is not electromagnetically rotated by perfectly 90 degrees from the axis of another resonance device in most cases. Thus, a certain portion of the power can be transferred between the particular resonance device and the other resonance device. In addition, even if the power relaying resonance device 58 is placed not on an axis connecting the power supplying resonance device 38 to the power receiving resonance device 78, that is, even if the power relaying resonance device 58 is placed at the periphery of the power supplying resonance device 38 and/or the power receiving resonance device 78, coupling based on resonance is established among the power supplying resonance device 38, the power relaying resonance device 58 and the power receiving resonance device 78. It is thus possible to increase the efficiency of transmission from the power supplying resonance device 38 to the power receiving resonance device 78.

Principles of Solutions to Arrangement Problems

A configuration employing the power relaying resonance device 58 raises a problem of how to place the power relaying resonance device 58 at a position between the power supplying resonance device 38 and the power receiving resonance device 78. In the case of only one power relaying resonance device 58, the middle position between the power supplying resonance device 38 and the power receiving resonance device 78 is a position optimum for the power relaying resonance device 58. There are two modes of the problem. The first mode of the problem is how to fix the power relaying resonance device 58 at a position determined in advance. The second mode of the problem is raised when a plurality of power relaying resonance devices 58 are used as a problem of how to determine intervals at which the power relaying resonance devices 58 are to be placed.

Fixing Technique

First of all, the following description explains a problem of the first mode and the principle of a solution to the problem which is a fixing-technique problem. As described earlier, the power relaying resonance device 58 serves as a repeater. Since the power relaying resonance device 58 itself has a simple antenna structure such as a coil structure, the configuration of the power relaying resonance device 58 is also simple as well. As shown in FIG. 4B, the power relaying resonance device 58 electrically includes an inductance component L and a capacitance component C which determine the self-resonant frequency. The self-resonant frequency is an electrical resonance frequency unique to the power relaying resonance device 58. The inductance L is determined by the shape of the coil of the power relaying resonance device 58 and the coil turns of the power relaying resonance device 58 whereas the capacitance C is determined by the stray capacitance existing at the periphery of the coil of the power relaying resonance device 58. From the structure of the repeater, it is a matter of course that the stray capacitance can be configured by making use of a fixed capacitor in order to form a resonance circuit having the required resonance frequency.

If the magnetic line Φ (or the magnetic field H) crossing the repeater changes with the lapse of time in accordance with the self-resonant frequency, an apparent power is accumulated in the repeater because the repeater itself is a resonance circuit. Thus, the repeaters resonate with each other, letting a power be transferred from one of the repeaters to the other one.

Since a repeater resonating at a large power attains an extremely high voltage, there is raised a problem of how to establish a method for fixing the repeater so that, in such a state, the repeater is not touched inadvertently. In addition, since the repeater itself is a resonance circuit having an extremely large Q value representing the degree of coil resonance, due to the quality of a material used for fixing the repeater, the Q value may decrease, worsening the efficiency of the power transmission. Thus, there is also raised a problem of how to fix the repeater without reducing the Q value. When the repeater is placed inadvertently at such a position that the repeater itself is brought into direct contact with a metallic thing for example, the resonance frequency changes, reducing the Q value. As a result, the efficiency of the power transmission decreases. That is to say, when actually making use of a repeater, it is important to fix the repeater at a proper position. At that time, it is conceivably necessary to adopt a repeater fixing method taking the characteristic of the repeater itself into consideration.

In order to solve the problems of the first mode, in accordance with this embodiment, the power relaying resonance device 58 serving as a repeater is provided at a position determined in advance by making use of an insulation member having a bearing force for bearing power transmission carried out by adoption of the resonance method.

An insulation member having a bearing force for bearing power transmission carried out by adoption of the resonance method is a member having a characteristic of electrical insulation. Thus, the insulation member has a voltage/current capacity capable of bearing a high voltage and a large current at a resonance time. In addition, it is also important to provide an insulation member causing no magnetic saturation. This is because magnetic saturation deteriorates the insulation characteristic. Of course, the resonance-time condition is affected by the application condition described in the specifications of the con-contact power transmission system. For example, the required bearing force of the insulation member for a repeater placed in an ordinary space is different from the required bearing force of the insulation member for a repeater embedded in a circuit device. A typical example of the repeater placed in an ordinary space is a repeater used for a long transmission distance of at least the cm order. In the following description, this typical repeater for a long transmission distance is referred to as the former repeater. On the other hand, a typical example of the repeater embedded in a circuit device is a repeater used for a short transmission distance of not greater than the mm order. In the following description, this typical repeater for a short transmission distance is referred to as the latter repeater. In the case of the former repeater for example, an insulation member made from glass or from an insulator material is an insulation member having the bearing force required by the former repeater. In the case of the latter repeater, on the other hand, a basic material such as a dielectric or semiconductor material can be used for making an insulation member having the bearing force required by the latter repeater. In either case, in a process of making the power relaying terminal 5, the power relaying resonance device 58 serving as a repeater can be fixed at a position determined by adoption of a simple method. A configuration focusing attention to the problems described above as problems of the first mode is referred to as a first embodiment to be described later in detail.

For example, an insulator made on the assumption that the insulator is to be fixed as a high-voltage electrical line has been actually made by taking creeping electrical discharge into consideration and by setting each of its shape and its length at a value varied in accordance with the voltage appearing on the high-voltage electrical line. In the future, if an operation to supply power in a non-contact way by making use of a repeater is assumed, the existing technology for making the insulator can be utilized very effectively. That is to say, the existing technology can be utilized very effectively in that the technology allows the development and manufacturing costs of a new insulator to be reduced. By making use of an insulator for fixing a repeater, the repeater fixing method can be simplified to conceivably create very effective means. For example, it is possible to assume that, in the near future, the repeater technology is applied also to the non-contact power supplying technique adopted as a method for supplying power to an electric car. With such assumption, the repeater fixing method can be adopted as extremely effective means.

Technique for Placing a Plurality of Repeaters

Next, the following description explains a problem of the second mode and the principle of a solution to the problem which is a problem raised when a plurality of repeaters have to be placed. As is obvious from FIG. 3, if the distance between resonators is too short, the efficiency of power transmission between the resonators deteriorates. The efficiency of power transmission deteriorates also in a configuration employing a plurality of repeaters. That is to say, also in the case of a configuration employing a plurality of repeaters, if the distance between resonators is too short, the efficiency of power transmission between the resonators deteriorates as well. This is because, if the distance between resonators is too short, the resonance characteristics of the resonators overlap each other. Thus, the Q values each representing the degree of coil resonance decrease. As a result, the efficiency of power transmission between the resonators deteriorates. The deterioration of the power transmission efficiency necessitates a method of making use of a repeater by consideration of the electrical characteristic of the repeater. In particular, when a plurality of repeaters are to be placed, the deterioration of the power transmission efficiency can be interpreted as a requirement to make use of a repeater by taking the electrical characteristic of the repeater into consideration.

Figure 5:
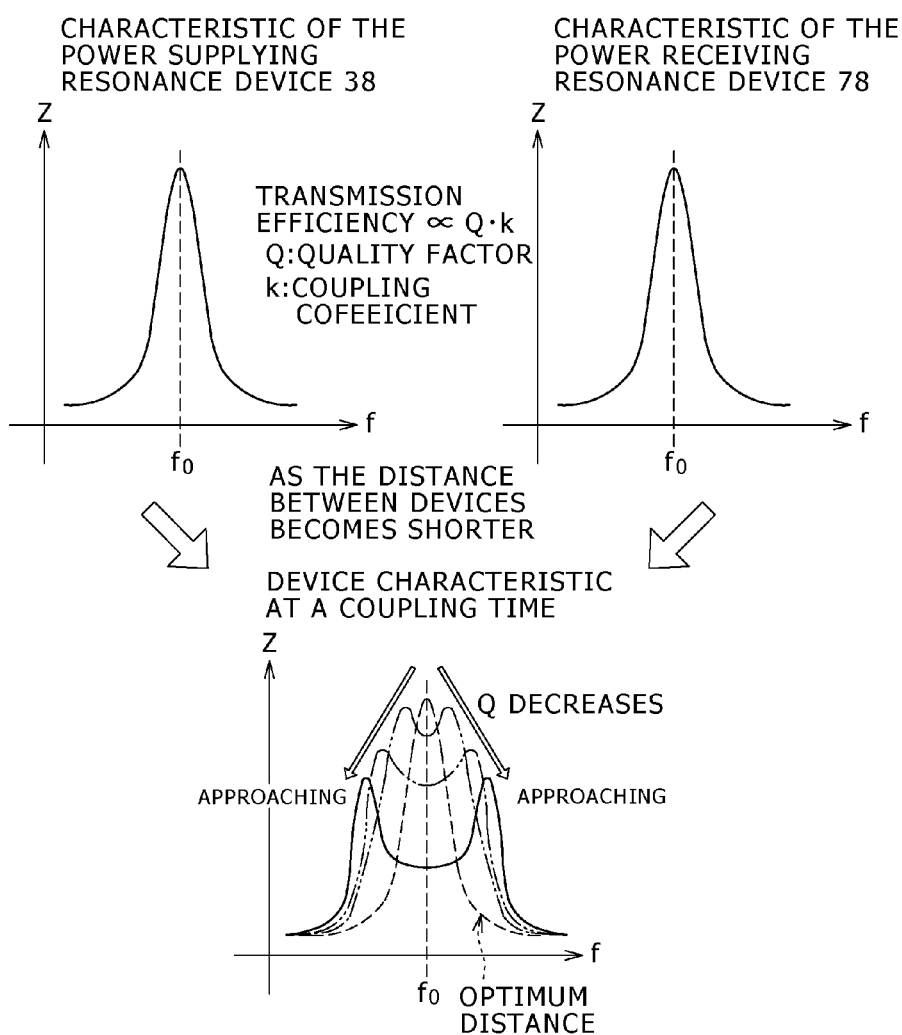
FIG. 5 is explanatory diagrams to be referred to in description of an electrical characteristic for a case in which two repeaters are placed at respectively two positions close to each other.

FIG. 5 is explanatory diagrams referred to in the following description of an electrical characteristic for a case in which two repeaters are placed at respectively two positions close to each other. Since a repeater is a resonance circuit having an extremely large Q value, due to electrical interferences between repeaters, the resonance frequency is split from the original value into two or more frequencies. In the typical example shown in FIG. 5, the resonance frequency is split from the original value into two frequencies, indicating the existence of electrical interferences between two repeaters. As a result, the Q value at the original resonance frequency decreases. In an assumed space where a plurality of repeaters are placed and power can be transmitted with a high degree of freedom, placing the repeaters densely will adversely reduce the efficiency of power transmission.

For example, the magnetic-field resonance occurs due to electrical coupling between the power supplying resonator and the power receiving resonator. Thus, if the distance between the resonators is lengthened, the electrical coupling weakens, reducing the mutual inductance. If the distance between the resonators is shortened, on the other hand, the electrical coupling becomes stronger, increasing the mutual inductance. As shown in FIG. 5, if the distance between the resonators is shortened, increasing the mutual inductance, the resonance frequency is split into two values. As the distance between the resonators is gradually lengthened, reducing the mutual inductance, the two values of the resonance frequency approach each other, finally merging at one value. When the distance between the resonators is further lengthened after the two values of the resonance frequency have merged at one value, the two resonance frequencies merging at one value do not move and only the efficiency of the power transmission decreases.

Phenomena occurring when the distance between resonators in the case of the electric-field resonance are the same as the phenomena occurring when the distance between resonators in the case of the magnetic-field resonance. That is to say, if the distance between the resonators is shortened, increasing the mutual inductance, the resonance frequency is split into two values. As the distance between the resonators is gradually lengthened, reducing the mutual inductance, the two values of the resonance frequency approach each other, finally merging at one value. When the distance between the resonators is further lengthened after the two values of the resonance frequency have merged at one value, the two resonance frequencies merging at one value do not move and only the efficiency of the transmission decreases.

In this process, if the Q value is fixed, that is, if no repeater exists for example, the power transmission efficiency at the resonance frequency is approximately fixed till the two values of the resonance frequency merge at one value. In the case of a repeater, however, in actuality, the shorter the distance between resonators, that is, the shorter the distance between the repeater and the power supplying resonator and/or the shorter the distance between the repeater and the power receiving resonator, the smaller the Q value. Thus, the shorter the distance between resonators, the lower the efficiency of the power transmission.

From the standpoint of an ordinary person not knowing details of the technology, however, when power is to be distributed widely in a space, it is assumed that there is raised a sensory misconception that, the larger the number of repeaters, that is, the higher the density of the repeaters, the more effective the distribution of the power. Intrinsically, the optimum density of the repeaters is determined by factors including the frequency of the magnetic field line to be handled, the distance of the power transmission, the electrical characteristic (that is, the impedance matching) and the size of the coil. Even if the repeaters are placed at proper locations, the distance between the repeaters may be undesirably short, conceivably reducing the efficiency of the power transmission.

In order to solve the problems of the second mode, this embodiment provides a repeater technology of further increasing the distance of the power transmission based on resonance. In accordance with the technology, when a plurality of power relaying resonance devices 58 each serving as a repeater are used, the repeaters are fixed at such positions that the distance between the repeaters is not too short. To be more specific, in this embodiment, the repeaters are fixed at such positions that the distance between the repeaters is not shorter than an allowable minimum interval defined as a minimum interval which is allowed. That is to say, it is desirable to apply the technique for solving the problems of the first mode in order fix the repeaters at such positions that the distance between the repeaters is not shorter than the allowable minimum interval. A configuration focusing attention on the second mode is referred to as a second embodiment to be described later in detail.

For example, in a process of manufacturing the power relaying terminal 5 by setting the repeater interval at a value not smaller than the allowable minimum interval, there is adopted a first or second technique. In accordance with the first technique, an accommodation case providing a repeater interval not smaller than the allowable minimum interval is used for every repeater. In accordance with the second technique, on the other hand, a pallet also referred to as a tray is used for placing the repeaters. In either of the techniques, in order to place the repeaters at a proper density, the repeaters are covered. Thus, the repeaters can be placed at intervals not shorter than the allowable minimum interval.

In accordance with the first technique for example, the power relaying resonance device 58 serving as a repeater is accommodated in an accommodation case having an external dimension not smaller than the allowable minimum interval or, desirably accommodated at the center of the accommodation case. With a repeater already accommodated in the accommodation case, the accommodation case is filled up with an insulation member. In this accommodation case, it is desirable to provide the insulation member used for filling up the accommodation case with a bearing force required at a resonance time. Furthermore, if the insulation member used for filling up the accommodation case has a sufficient bearing force required at a resonance time, the accommodation case can be made from a conductor material such as a metal. It is desirable to provide the accommodation case also having a bearing force required at a resonance time.

A repeater may be placed at a one-sided location in its accommodation case instead of being placed at the center of its accommodation case. In a process of linking a plurality of accommodation cases to each other, however, the intervals between the repeaters can be sustained at a value not shorter than the allowable minimum interval provided that each accommodation case has a size not smaller than the allowable minimum interval and every repeater is placed at the same one-sided location in its accommodation case. In addition, if each repeater is placed at the center of its accommodation case, without regard to the relation of the positions of the accommodation cases, the intervals between the repeaters can be sustained at a value not shorter than the allowable minimum interval in the process of linking a plurality of accommodation cases to each other provided that each accommodation case has a size not smaller than the allowable minimum interval.

By accommodating each repeater in an accommodation case having a size not smaller than the allowable minimum interval, without regard to whether or not the accommodation cases are linked to form an array, the repeater itself can be prevented from being brought into contact with another piece of metal and, at the same time, the repeater having a high voltage is never touched directly. In addition, a plurality of repeaters can also be prevented from being placed at intervals shorter than the allowable minimum interval. As a result, the efficiency of the power transmission can be prevented from decreasing. Thus, the first technique is a simple method for accommodating each repeater in an accommodation case and can therefore be adopted as extremely effective means.

In accordance with the second technique, in a process of manufacturing the power relaying terminal 5, each power relaying resonance device 58 serving as a repeater is laid at a desired position of one of segments obtained as a result of dividing a segmentation mechanism by making use of a fixing frame for fixing the segments at intervals not shorter than the allowable minimum interval. It is desirable to lay each repeater at the center of its segment. The segmentation mechanism is configured from an insulation member. As a mechanism for positioning each power relaying resonance device 58, it is possible to adopt means such as a pallet (also referred to as a tray) for aligning the power relaying resonance devices 58. By adoption of such means, it is possible to reduce the cost of the process of manufacturing the power relaying terminal 5 and the time it takes to carry out the process. In addition, the distance between resonators can be sustained at a value not shorter than the allowable minimum interval with a high degree of reliability. In this case, the distance between resonators is not only the distance between power relaying resonance devices 58 but also the distance between the power relaying resonance device 58 and the power supplying resonance device 38 as well as the distance between the power relaying resonance device 58 and the power receiving resonance device 78. This is because, since the segment pitch is not smaller than the allowable minimum interval, the interval between repeaters is not shorter than the allowable minimum interval even if each of the repeaters is laid on one of the segments. In addition, if a repeater is placed for every N segments, the interval between repeaters becomes equal to N times the segment pitch and, is of course longer than the allowable minimum interval. The second technique is also a simple method in accordance with which the characteristic of each repeater itself is taken into consideration so as to prevent the efficiency of transmission of power from deteriorating due to interferences between repeaters. That is to say, the second technique is means for preventing repeaters from being placed at positions too close to each other.

There are a variety of ways in which a repeater for relaying power by adoption of the non-contact technique is used. If the characteristics of the repeater are not well understood, however, the expected effect of the utilization of the repeater cannot be realized. The Q value of a repeater is a typical example of the characteristics of the repeater. By adoption of the first or second technique described above, however, it is possible to prevent the Q value representing the degree of coil resonance through mutual coupling between resonators from decreasing due to too short a distance between the resonators or at least to minimize the reduction of the Q value. In this case, the distance between the resonators is not only the distance between the resonators of repeaters, but also the distance between the resonator of a repeater and the resonator on the power supplying side as well as the distance between the resonator of a repeater and the resonator on the power receiving side. The first and second techniques are good means for preventing the efficiency of the power transmission from decreasing due too short a distance between resonators.

First Typical Example of the First Embodiment

Figure 6A:
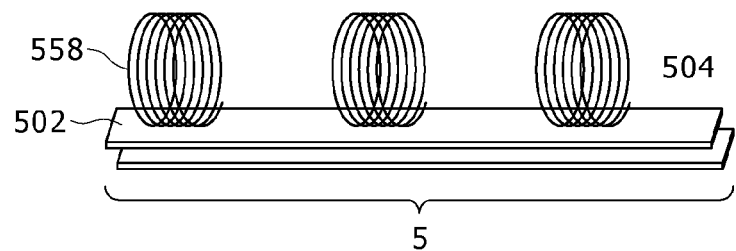
FIGS. 6A, 6B, 6C and 6D are explanatory diagrams to be referred to in description of a method for placing repeaters in accordance with a first typical example of a first embodiment of the present disclosure.
Figure 6B:
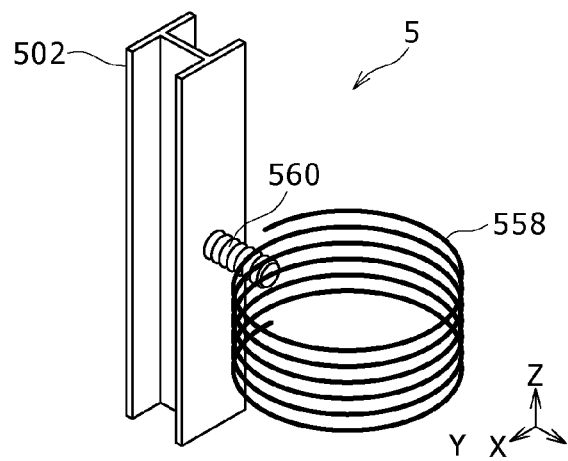
Figure 6C:
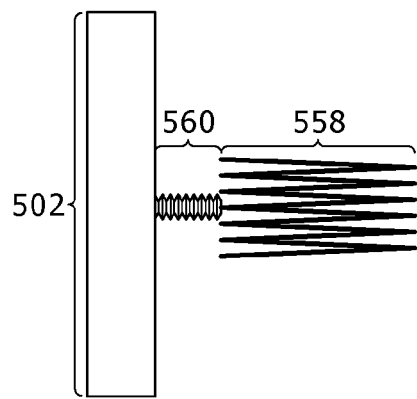
Figure 6D:
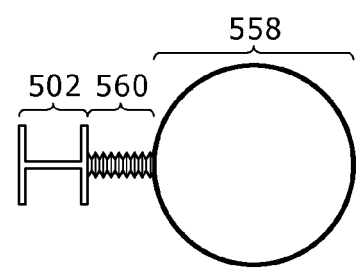

FIGS. 6A to 6D are a plurality of explanatory diagrams referred to in the following description of a method for placing repeaters in accordance with a first typical example of the first embodiment of the present disclosure. To be more specific, FIG. 6A is a diagram showing a comparison example to be compared with the first typical example of the first embodiment whereas FIG. 6B is a plurality of diagrams showing the first typical example of the first embodiment. In the first typical example of the first embodiment, a holding body also referred to as a fixing base is typically a metal body 502 such as an iron tower. The first typical example of the first embodiment is thus a typical application in which the repeater is fixed on the fixing base.

Since the repeater is a resonance circuit having an extremely high Q value, if the repeater is used as a power transmission medium having a transmission distance of at least the cm order in the resonance method, the repeater itself will have an extremely high voltage of at least 1,000 V. In addition, since the repeater itself is required to have a large Q value, the repeater has to be placed and fixed carefully because effects of the quality of the material used for fixing the repeater and things surrounding the material may conceivably reduce the Q value. When a repeater 558 corresponding to the power relaying resonance device 58 is fixed on a metallic body 502 such as a construction/architecture pillar or an iron tower as shown in FIG. 6A for example, the repeater 558 is fixed directly on the metallic body 502 by making use of a metal material 504. In this case, since the iron tower itself serves as the earth, the repeater 558 itself is directly connected to the earth. As a result, the Q value decreases so that the function of the power transmission medium is lost. It is thus necessary to actually float the repeater 558 from the metallic body 502 or put the repeater 558 in a state of being electrically disconnected in actuality from the metallic body 502. Even if the repeater 558 is floated from the metallic body 502, however, it is necessary to devise a repeater capable of bearing a high voltage and a large current at a resonance time.

As a typical solution to the problem described above, as shown in FIG. 6B, the power relaying terminal 5 is used by fixing the repeater 558 on the metallic body 502 by making use of an insulation member 560 having a bearing force required at a resonance time. For example, an insulator can be used generally as the insulation member 560. In this case, the insulator is used for fixing and holding a power transmission cable without an insulated film. In addition, if the insulation member 560 has to have the quality of a material electrically functioning as an insulator, a piece of glass can also be used as the insulation member 560. If a non-contact power transmission system 1 is configured by making use of the repeater 558 in a large power environment such as an operation to electrically charge an electric vehicle for example, the first typical example of the first embodiment is considered to offer an effective basic technology.

Second Typical Example of the First Embodiment

Figure 7A:
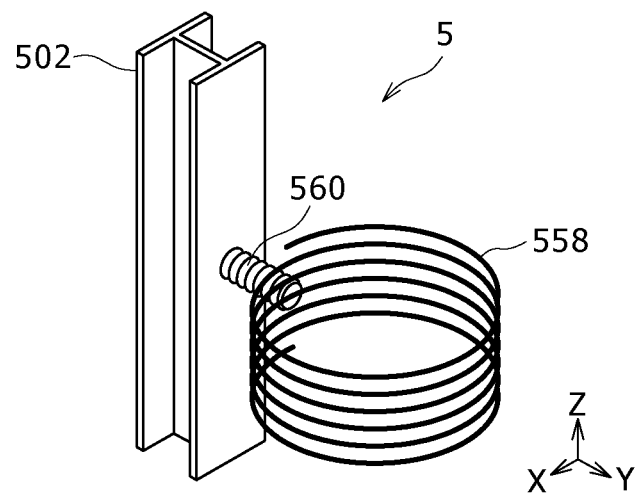
FIGS. 7A and 7B are explanatory diagrams to be referred to in description of a method for placing repeaters in accordance with a second typical example of the first embodiment.
Figure 7B:
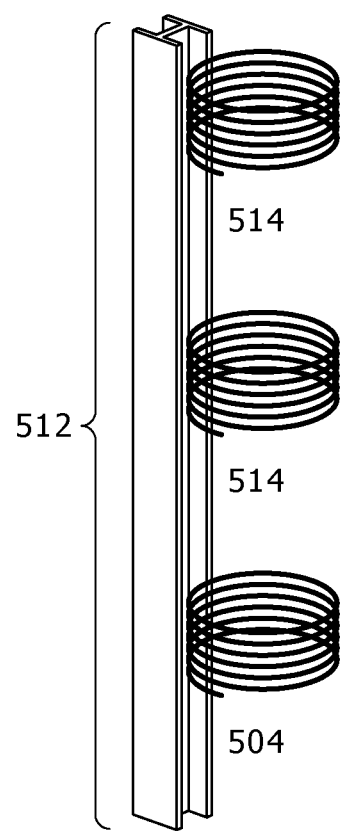

FIGS. 7A and 7B are a plurality of explanatory diagrams referred to in the following description of a method for placing repeaters in accordance with a second typical example of the first embodiment. To be more specific, FIG. 7A is a diagram showing the first example provided by the first embodiment to serve as a comparison example to be compared with the second typical example of the first embodiment whereas FIG. 7B is a diagram showing the second typical example of the first embodiment.

The second typical example of the first embodiment is a typical application in which a holding body 512 (also referred to as a fixing base) itself has a bearing force required at the resonance time and repeaters 558 are fixed on the holding body 512. For example, the holding body 512 is a piece of glass or an insulator for holding the power relaying terminal 5. In this case, as shown in FIG. 7B, the repeaters 558 are conceivably fixed on the holding body 512 directly. For example, the repeaters 558 are fixed on the holding body 512 by making use of adhesion bonds 514 or metal bodies 504. By the way, even if the holding body 512 is an insulation body, this repeater fixing/using method is not applicable to the holding body 512 provided that its material quality has a big dielectric-substance loss.

Third Typical Example of the First Embodiment

Figure 8A:
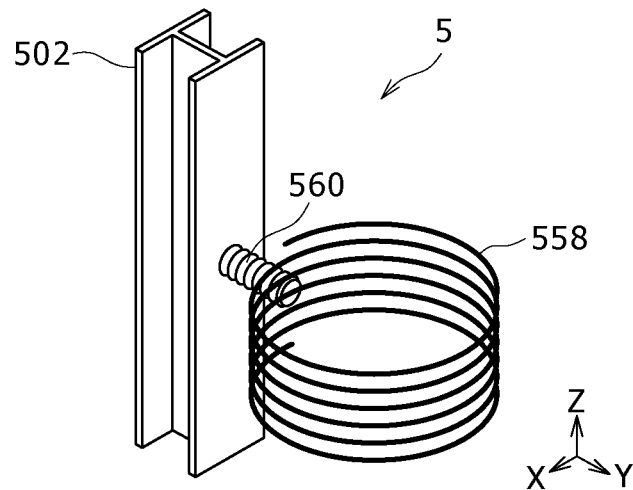
FIGS. 8A and 8B are explanatory diagrams to be referred to in description of a method for placing repeaters in accordance with a third typical example of the first embodiment.
Figure 8B:
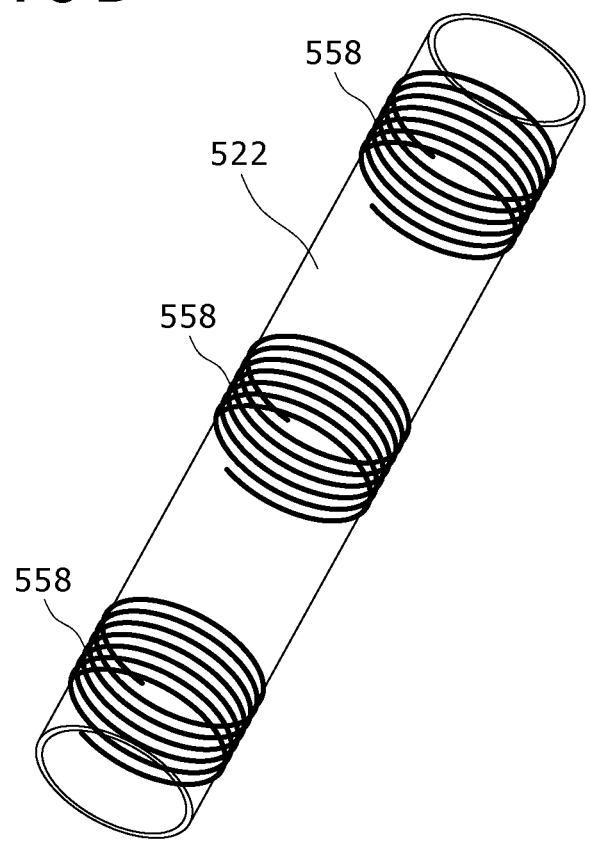

FIGS. 8A and 8B are a plurality of explanatory diagrams referred to in the following description of a method for placing repeaters in accordance with a third typical example of the first embodiment. To be more specific, FIG. 8A is a diagram showing the first example provided by the first embodiment to serve as a comparison example to be compared with the third typical example of the first embodiment whereas FIG. 8B is a diagram showing the second example provided by the first embodiment.

The third typical example of the first embodiment is a typical application in which, if a holding body 522 itself has a bearing force required at the resonance time, the holding body 522 is formed into the shape of a pipe and repeaters 558 are fixed in the pipe. For example, the power relaying terminal 5 is provided with the holding body 522 formed into the shape of a pipe configured from an insulation member having a bearing force required at the resonance time. In this case, the repeaters 558 are embedded inside the holding body 522, being directly fixed at positions determined in advance on the inner surface of the holding body 522. Typically, the repeaters 558 are fixed at positions through an adhesion bond.

In the third typical example of the first embodiment, as power supplying means, repeaters 558 are used at a location in a situation making it difficult for a person to enter the location. In this case, the third example is conceivably applicable as a method for fixing the repeaters 558. For example, the reader is advised to assume the tunnel of an extremely long tube. A typical example of such a tunnel is an elevator moving directly to and from a static satellite or the like. An ordinary elevator is hung by making use of wires and moves up and down. In the case of an extremely long elevator, wire control is not carried out. Instead, the reader may assume an image of a train moving back and forth along the inside of the tube. Of course, power can be supplied to the train by making use of the locus of the train. If a wire is broken due to some troubles, however, the repeaters 558 can be conceivably used as means for supplying supplementary power to the train. The repeaters 558 are placed and fixed along the tube such as a tube made from glass at equal intervals so that the glass tube itself is treated like a power transmission medium. In this case, the glass tube is the assumed elevator which is extremely long and corresponds to the holding body 522. Of course, a current does not flow directly to the glass tube as is the case with a conductive wire.

As described above, as power supplying means, repeaters 558 can be used at a location in a situation making it difficult for a person to enter the location. As a method for fixing the repeaters 558, the third typical example of the first embodiment is extremely effective.

Fourth Typical Example of the First Embodiment

Figure 9:
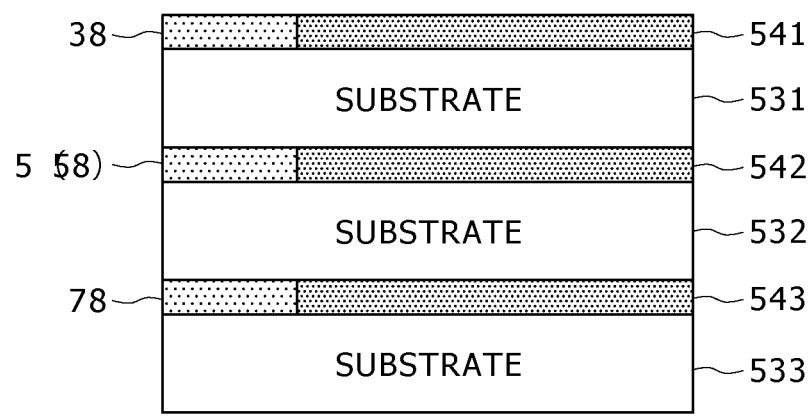
FIG. 9 is an explanatory diagram to be referred to in description of a method for placing repeaters in accordance with a fourth typical example of the first embodiment.

FIG. 9 is an explanatory diagram referred to in the following description of a method for placing repeaters in accordance with a fourth typical example of the first embodiment. The fourth typical example of the first embodiment is applied to a non-contact power transmission system 1 embedded in a circuit device such as a semiconductor device. In this case, if the transmission distance between the power supplying resonance device 38 and the power receiving resonance device 78 is subjected to manufacturing restrictions, the fourth typical example of the first embodiment is applied to a process of providing the power relaying terminal 5. In the case of a non-contact power transmission system 1 embedded in a semiconductor device for example, the fourth typical example of the first embodiment is applied to the creation of a layer lamination structure of the semiconductor.

FIG. 9 is a diagram showing a power supplying resonance device 38, a power receiving resonance device 78, a power relaying resonance device 58 included in a power relaying terminal 5, substrates 531 to 533 and metal layers 541 to 543. It is assumed that, due to manufacturing restrictions, at the upper stage, the power supplying resonance device 38 and the metal layer 541 are provided on the substrate 531 whereas, at the middle stage, the metal layer 542 and the power relaying resonance device 58 are provided on the substrate 532. At the lower stage, the power receiving resonance device 78 and the metal layer 543 are provided on the substrate 533. In this structure, power is transferred from the power supplying resonance device 38 to the power receiving resonance device 78. The transferred power is then supplied to the metal layer 543.

In a structure like the one shown in the figure, the power relaying resonance device 58 of the power relaying terminal 5 is created in the metal layer 542 between the power supplying resonance device 38 and the power receiving resonance device 78 in order to increase the efficiency of the power transfer between the power supplying resonance device 38 and the power receiving resonance device 78. The substrate 531 and the substrate 532 are used as insulation members for holding and fixing the power relaying resonance device 58.

Second Embodiment

First Typical Example of the Second Embodiment

Figure 10A:
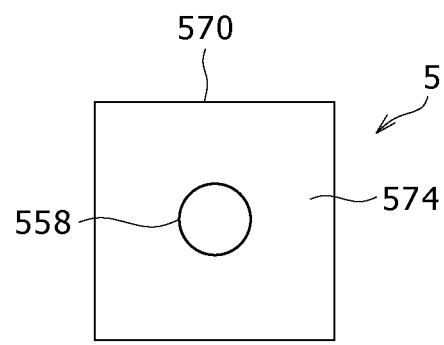
FIGS. 10A to 10C are explanatory diagrams to be referred to in description of a method for placing repeaters in accordance with a first typical example of a second embodiment of the present disclosure.
Figure 10B:
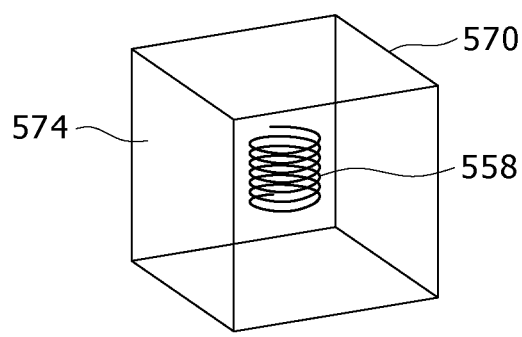
Figure 10C:
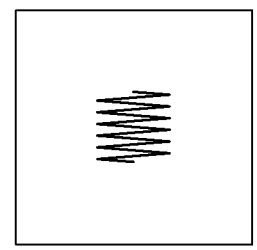

FIGS. 10A and 10B are a plurality of explanatory diagrams referred to in the following description of a method for placing repeaters in accordance with a first typical example of the second embodiment. The first typical example of the second embodiment is a typical application in which every repeater is accommodated in an accommodation case having an external dimension not smaller than the allowable minimum interval.

The power relaying terminal 5 has a structure in which each repeater 558 is accommodated in an accommodation case 570 having an external dimension not smaller than the allowable minimum interval or desirably accommodated at the center of the accommodation case 570. Then, with the repeater 558 accommodated in the accommodation case 570 by not being brought into contact with the inner wall of the accommodation case 570, the accommodation case 570 is filled up with an insulation member 574 in order to fix the repeater 558 in the accommodation case 570. The accommodation case 570 and the insulation member 574 serving as the filling material each have a bearing force required at the resonance time. It is to be noted that, in a process of placing a repeater 558 inside an accommodation case 570, instead of filling up the accommodation case 570 with insulation member 574, the repeater 558 is supported and fixed in the accommodation case 570 by making use of an insulation member 560 in accordance with a technique according to the first embodiment in such a way that the repeater 558 is not brought into contact with the accommodation-case wall surface. In such a process, it is desirable to fill up the accommodation case 570 with insulation member 574 in order to enhance the insulation characteristic to a degree higher than the insulation characteristic of the air.

In order to place the repeaters 558 at a proper density, as described above, every repeater 558 itself is accommodated in an accommodation case 570. In other words, the repeater 558 is veiled by the accommodation case 570 serving as an exterior cover. Then, the inside of the accommodation case 570 is filled up with the insulation member 574 in order to fix the repeater 558 in the accommodation case 570. In this way, it is possible to place the repeaters 558 at intervals not shorter than the allowable minimum interval determined in advance. It is to be noted that, with a repeater 558 accommodated in the accommodation case 570, the self-resonant frequency of the repeater 558 itself is put in an optimum state defined as a state in which the self-resonant frequency of the repeater 558 matches the self-resonant frequency of the power supplying resonance device 38 and the self-resonant frequency of the power receiving resonance device 78.

When transmitting power, the repeater 558 itself generates an extremely high voltage. Since the repeater 558 is accommodated in the accommodation case 570, however, the repeater 558 cannot be touched directly from the outside of the accommodation case 570.

In case the repeater 558 itself is accommodated in the accommodation case 570, being brought inadvertently into direct contact with a piece of metal or the like, the self-resonant frequency of the repeater 558 changes, reducing the Q value of the repeater 558. As a result, the efficiency of the power transmission is also decreased as well. However, an effort can be made to solve this problem. The effort is made, for example, by making the quality of the material serving as the exterior of the accommodation case 570 accommodating the repeater 558 the same as the quality of an insulator and, in addition, by making use of the insulation member 574 to fill up the inside of the accommodation case 570 in order to substantially reduce the dielectric-substance loss.

The reader is advised to keep in mind that it is desirable to provide a configuration in which the exterior of the accommodation case 570 and the insulation member 574 are made from a magnetic material in order for the repeater 558 to be able to supply a large power at a high Q value. However, such a configuration may not be absolutely important in some cases. The point is dependence on the magnetic saturation of the magnetic material. Thus, it is nice to make the exterior of the accommodation case 570 and the insulation member 574 from a magnetic material having a quality of not getting into magnetic saturation.

Such a first typical example of the second embodiment can be properly applied to a case described as follows. When a repeater 558 is used as a power transmission medium, the repeater 558 can be utilized by adoption of the following method. For example, it is assumed that the first typical example of the second embodiment can be properly applied to a location at which a person is hardly capable of doing maintenance work. Typical examples of such a location are an environment in which power is to be transferred to a camera for taking pictures of definite observation spots such as the eruption mouth of a burning mountain and a power transmission cable can hardly be drawn from a power source to the camera, the cosmic space such as the location of an artificial satellite and a place used for burying a land mine.

In the case of a camera for taking pictures of definite observation spots such as the eruption mouth of a burning mountain for example, the power transmission cable can be conceivably damaged inadvertently by ejected lava or the like. In addition, once broken, the power transmission cable cannot be repaired with ease. On top of that, also for a case in which some power has to be supplied to the exterior of an artificial satellite floating in the cosmic space, since the artificial satellite is floating in the cosmic space, a person cannot do maintenance work with ease. In addition, it cannot be completely said that the power transmission cable is never broken by cosmic-space debris or the like. It is also difficult as well to supply power to a place used for burying a land mine. The application of the repeater 558 to such environments is made possible by an extremely effective technology capable of considerably increasing the non-contact power transmission distance.

However, according to a method for making use of a repeater 558 in accordance with the electrical characteristic of the repeater 558, particularly, according to a method for using a plurality of repeaters 558, the repeaters 558 have to be placed by taking the characteristics of each of the repeaters 558 into consideration. This is because, as described earlier, the repeater 558 is a resonator having an extremely high voltage. Thus, due to interferences between the repeaters 558, the resonance frequency is split from its original value into two values. As a result, the Q value at the original resonance frequency decreases. In particular, when there is assumed a space in which a plurality of repeaters 558 are placed and power can be taken out with a high degree of freedom, placing the repeaters 558 densely at too short intervals will cause the efficiency of the power transmission to decrease.

For example, a method for supplying power to a camera for taking pictures of definite observation spots at a location such as the eruption mouth of a burning mountain is thought of as follows. In this case, the camera itself is assumed to have a radio-apparatus function for transmitting image data generated by the camera. Thus, a cable for transmitting the image data is not required. Normally, however, a power supplying cable is used for connecting a safe power source to the camera placed at the eruption mouth of a burning mountain to serve as a camera having a radio-apparatus function. Since the camera having a radio-apparatus function is placed at the eruption mouth of a burning mountain, however, in the surroundings of the camera, hot vapor or the like may be being ejected by the burning mountain. As a result, the cover of the power supplying cable may melt and deteriorate due to heat generated by the burning mountain so that the function of the cable cannot be carried out. In such an event, the power supplying cable cannot be replaced with ease.

Figure 11:
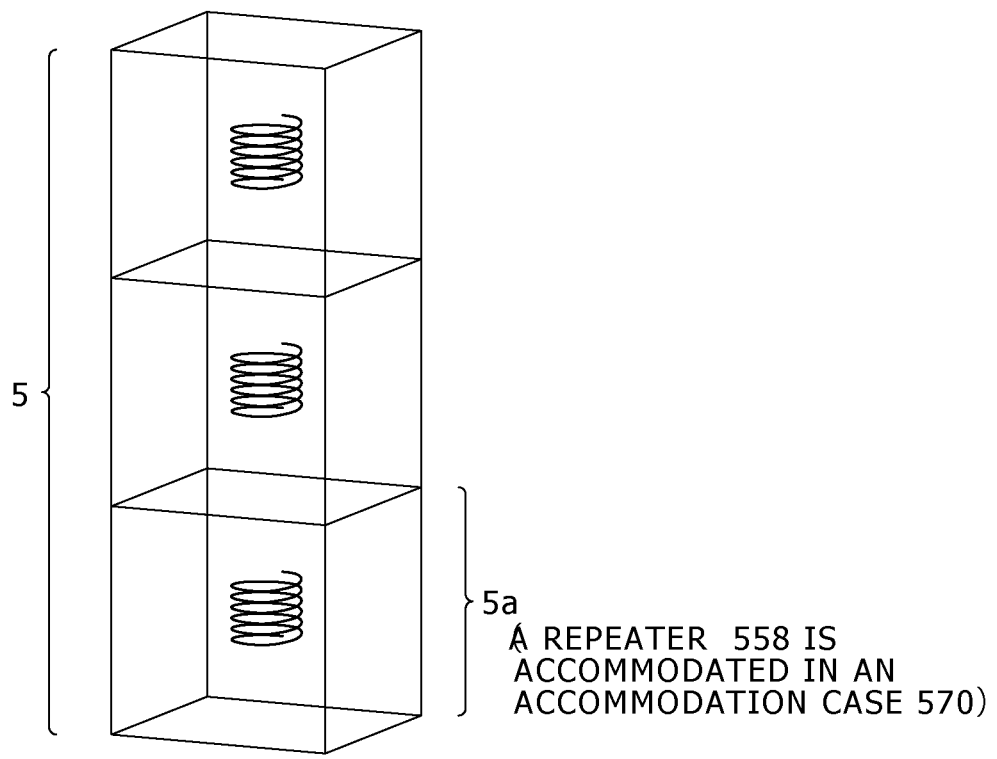
FIG. 11 is an explanatory diagram to be referred to in description of a method for placing repeaters in accordance with a second typical example of the second embodiment.

In order to solve the problem described above, in accordance with the first typical example of the second embodiment, there is devised a method for distributing power relaying resonance devices 58 each accommodated in an accommodation case 570 in the power relaying terminal 5 from the air to the surroundings of the camera. The accommodation cases 570 distributed from the air to the surroundings of the camera as the accommodation cases of the power relaying terminal 5 form a space for transferring power to the camera in the surroundings of the camera. Of course, the intervals of the repeaters 558 are not too short. In addition, there are no mutual interferences with metallic materials spread by eruptions of the burning mountain. As a result, power can be supplied to the camera. As a matter of course, even if the accommodation case 570 is melted by lava or the like or even if the supplying of power is discontinued due to a damage caused by a falling rock or the like, the power relaying resonance devices 58 each accommodated in an accommodation case 570 in the power relaying terminal 5 can be distributed again from the air to the surroundings of the camera without taking a risk caused by direct connection of a power supplying cable to the camera. Second Typical Example of the Second Embodiment FIG. 11 is an explanatory diagram referred to in the following description of a method for placing repeaters in accordance with a second typical example of the second embodiment. The second typical example of the second embodiment is applied to a configuration in which each repeater is accommodated in an accommodation case having an external dimension not shorter than the allowable minimum interval and a plurality of such accommodation cases are linked to form an array.

In the configuration shown in FIG. 11, a power relaying sub-terminal 5a is an accommodation case 570 for accommodating a repeater 558. A plurality of such power relaying sub-terminals 5a are linked properly to form the power relaying terminal 5. By forming the power relaying terminal 5 in this way, it is possible to implement a power transmission space. The accommodation case 570 itself has a sufficient size for properly sustaining intervals between the repeaters 558 at least at the allowable minimum interval. That is to say, the intervals between the repeaters 558 can be made not shorter than the allowable minimum interval as long as the accommodation case 570 itself has such a size. Thus, even if the work to install the repeaters 558 is carried out by a worker not knowing the characteristic of the repeater 558 at all, the second typical example of the second embodiment provides a technique for manufacturing the power relaying terminal 5 without placing the repeaters 558 at too short intervals on the basis of an effective technology.

Third Typical Example of the Second Embodiment

Figure 12:
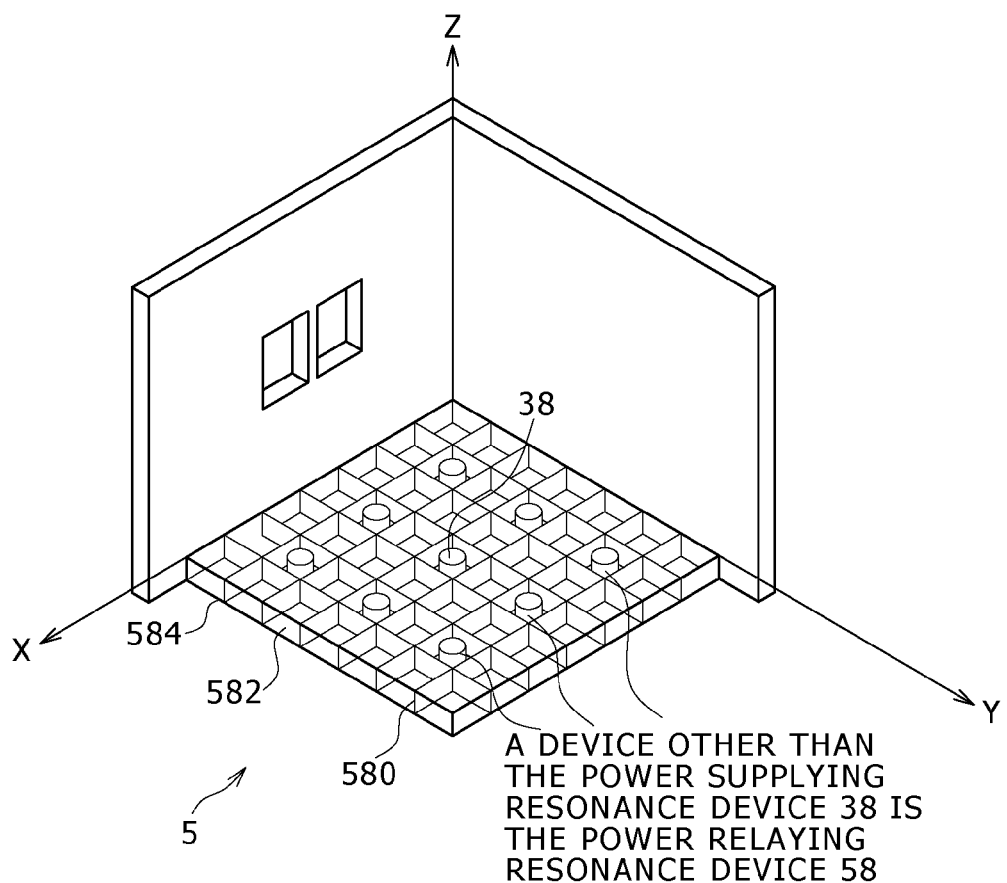
FIG. 12 is an explanatory diagram to be referred to in description of a method for placing repeaters in accordance with a third typical example of the second embodiment.

FIG. 12 is an explanatory diagram referred to in the following description of a method for placing repeaters in accordance with a third typical example of the second embodiment. The third typical example of the second embodiment is applied to a configuration in which each repeater is laid at a desired position of one of segments obtained as a result of segmentation and fixed by a fixing frame at intervals not shorter than the allowable minimum interval.

As shown in the figure, the power relaying terminal 5 supports a segmentation mechanism 580 on which a number of segments 582 each having a pallet shape also referred to as a tray shape are provided. Each of the segments 582 is capable of accommodating an accommodation case 570 used for accommodating a repeater 558 or a power supplying resonance device 38 (or a repeater 558). In a process of placing the power supplying resonance device 38 alone in a segment 582, the technique according to the first embodiment is adopted in order to support and fix the power supplying resonance device 38 by making use of an insulation member 560 in such a way that the power supplying resonance device 38 is not brought into contact with the wall surface 584. It is desirable to further fill up the accommodation case 570 with an insulation member 574 in the same way as the first typical example of the second embodiment in order to enhance the insulation characteristic to a degree higher than the insulation characteristic of the air. In a process of accommodating the accommodation case 570 used for accommodating the repeater 558, the repeater 558 is fixed in advance by adopting the technique according to the first typical example of the second embodiment.

In the segmentation mechanism 580, the wall surface 584 used for creating the segment 582 is assumed to have been configured from an insulation member. The wall surface 584 includes not only side surfaces, but also top and bottom surfaces. It is to be noted that, in actuality, one of a plurality of segments 582 is used for the power supplying terminal 3. In other words, a semi-complete product of the non-contact power transmission system 1 having the power supplying terminal 3 and the power relaying terminal 5 is manufactured. As will be described later, such a product is configured as a floor or the like and, on the floor, an electronic apparatus serving as the power receiving terminal 7 and other apparatus are placed in order to produce the complete product of the non-contact power transmission system 1.

The segment pitch is set at a value not shorter than the allowable minimum interval. With the segment pitch set at such a value, a repeater 558 or an accommodation case 570 used for accommodating a repeater 558 is laid on each segment 582 in order to complete the process of manufacturing the power relaying terminal 5 including repeaters 558 placed at intervals each equal to or longer than the allowable minimum interval. If a repeater 558 is laid for every N segments, the interval of the repeaters 558 is equal to N times the segment pitch and, of course, longer than the allowable minimum interval.

The third typical example of the second embodiment can be well applied to the following case. For example, an electromagnetic induction type exists in the existing method for supplying power in a non-contact way. This method is a method making use of dielectric coupling by a coil. This method is adopted for supplying power to an electrical product used mainly with water. Typical examples of such an electrical product are an electrical tooth brush and an electrical razor. The method is characterized in that no electrical contact is required.

On the other hand, the non-contact power supplying method making use of repeaters 558 according to this embodiment has the resonance type demonstrating effects that cannot be obtained by the electromagnetic induction type. That is to say, both the methods are a space power transmission method making use of an AC magnetic line or an AC magnetic field. In comparison with the electromagnetic induction type, however, the resonance type transmits power by providing the resonator or the resonance device with a high Q value in a positive manner. Thus, in comparison with the electromagnetic induction type, the resonance type is capable of supplying power to a power receiving apparatus placed at a location far away from the power supplying apparatus. In addition, the resonance type also adopts a technology such as the technology for making use of the repeater 558. Of course, the resonance type does not require an electrical contact point.

For example, there is an assumed configuration in which, in accordance with each of the two methods, coils are laid on a surface of the floor in order to configure a power transmission space like the one shown in FIG. 12. In the assumed configuration, a cleaner not requiring an 100 V AC plug is used. In this case, it is possible to reduce the number of coils each serving as a resonator in this embodiment because the embodiment implements the resonance type.

In addition, in the case of the electromagnetic induction type, it is necessary to provide each coil with a circuit for supplying power to the coil or a section capable of supplying power to the coil. The power supplying circuit or the power supplying section is required to supply power to the coil with a timing just corresponding to a time at which the cleaner is moving over the coil. That is to say, in the case of the non-contact power supplying system having the already commonly adopted electromagnetic induction type, it is necessary for the power supplying source and the power recipient to share a magnetic flux. Thus, in order to transmit power with a high degree of efficiency, it is necessary to place the power supplying source and the power recipient at respectively positions close to each other. In addition, it is important to align the coupling axes.

In the case of the resonance type according to the embodiments, on the other hand, the laid coil carries out the function of a resonator serving as a repeater 558. Thus, if power is supplied to any one certain coil used as a resonator, the same function can be carried out. In comparison with the electromagnetic induction type, the non-contact power supplying method provided by the embodiments as a method making use of a resonance phenomenon is capable of transmitting power over a long distance by virtue of the principle of the resonance phenomenon. In addition, the non-contact power supplying method provided by the embodiments has a merit that the efficiency of the power transmission does not deteriorate much even if the coupling axes are misaligned to a certain degree.

The present disclosure has been exemplified above by describing the embodiments. However, the technological domain of the present disclosure is by no means limited by a range in which the embodiments are explained. That is to say, the embodiments can be modified and/or improved in a variety of ways into a number of improved modifications within a range not deviating from gist of the present disclosure. In this case, configurations including the modifications as well as improvements are also included in the technological domain of the present disclosure.

In addition, the embodiments described above by no means limit the range of disclosures described in claims appended to this specification of the disclosure. On top of that, all combinations of characteristics explained in the descriptions of the embodiments are not always absolutely required for means provided by the present disclosure as the means for solving the problems. The embodiments described above include disclosures discovered at a variety of stages and, by making use of a proper combination in a plurality of disclosed configuration prerequisites, a variety of disclosures can be extracted. Even if some of all the configuration prerequisites shown in the embodiments are eliminated, a configuration without the eliminated configuration prerequisites can be extracted as a disclosure as long as the configuration demonstrates an effect.

The present disclosure contains subject matter related to that disclosed in Japanese Priority Patent Application JP 2010-160412 filed in the Japan Patent Office on Jul. 15, 2010, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:

1. A power relaying apparatus, comprising:
   a plurality of power relaying resonance devices disposed between a power supplying device and a power receiving device, wherein the plurality of power relaying resonance devices are configured to resonate between the power supplying device and the power receiving device; and
   a holding body configured from an insulation member configured to electrically insulate the plurality of power relaying resonance devices at resonance,
      wherein the plurality of power relaying resonance devices are enclosed inside the holding body, and
      wherein the plurality of power relaying resonance devices are disposed at respective determined positions within the holding body to relay power.

2. The power relaying apparatus according to claim 1, wherein the insulation member is made from at least one of glass or an insulator material.

3. The power relaying apparatus according to claim 1, wherein the plurality of power relaying resonance devices are positioned at equal intervals inside the holding body.

4. A power transmission system, comprising:
   a power supplying apparatus, comprising:
      a power supplying resonance device; and
      a power supplying power supply section configured to supply an AC current to the power supplying resonance device;
   a power receiving apparatus which comprises a power receiving resonance device configured to receive power from the power supplying apparatus by a resonance method;
   a power relaying apparatus arranged between the power supplying apparatus and the power receiving apparatus, wherein the power relaying apparatus comprises a plurality of power relaying resonance devices,
      wherein each of the plurality of power relaying resonance devices is disposed between the power supplying resonance device and the power receiving resonance device and is configured to resonate between the power supplying resonance device and the power receiving resonance device; and
   a holding body configured from an insulation member configured to electrically insulate the plurality of power relaying resonance devices at resonance,
      wherein the plurality of power relaying resonance devices are enclosed inside the holding body, and
      wherein the plurality of power relaying resonance devices are disposed at respective determined positions within the holding body.

5. The power transmission system according to claim 4, wherein the plurality of power relaying resonance devices are fixed at the respective determined positions on an inside surface of the holding body.

6. The power transmission system according to claim 5, wherein each of the plurality of power relaying resonance devices is attached to the inside surface of the holding body by means of an adhesion bond.

7. The power transmission system according to claim 4, wherein the insulation member is made from at least one of glass or an insulator material.

8. The power transmission system according to claim 4, wherein the plurality of power relaying resonance devices are positioned at equal intervals inside the holding body.

9. The power transmission system according to claim 8, wherein the plurality of power relaying resonance devices are fixed at the respective determined positions on an inside surface of a pipe-shaped holding body.

10. The power transmission system according to claim 9, wherein each of the plurality of power relaying resonance devices is attached to an inside surface of the holding body by means of an adhesion bond.

\* \* \* \* \*